United States Patent [19]

Rossiter et al.

[11] Patent Number: 5,676,826
[45] Date of Patent: Oct. 14, 1997

[54] FLUID-SOLID CONTACTING APPARATUS

[75] Inventors: Gordon J. Rossiter, Lakeland; Ronald J. Riley, Tampa, both of Fla.

[73] Assignee: Advanced Separation Technologies Incorporated, Lakeland, Fla.

[21] Appl. No.: 425,074

[22] Filed: Apr. 19, 1995

[51] Int. Cl.⁶ .................................................. B01D 15/02
[52] U.S. Cl. ........................... 210/91; 210/264; 210/267; 210/284; 422/269
[58] Field of Search ..................... 55/474; 95/113; 210/264, 267, 284, 91; 422/269, 270

[56] References Cited

U.S. PATENT DOCUMENTS

| | | | |
|---|---|---|---|
| 2,639,000 | 5/1953 | Edwards | 96/125 |
| 2,706,532 | 4/1955 | Ringo et al. | 96/122 |
| 2,877,861 | 3/1959 | Miller | 95/113 |
| 2,918,938 | 12/1959 | Kimball | 137/625.11 |
| 2,967,148 | 1/1961 | Karnofsky | 208/310 R |
| 2,997,068 | 8/1961 | Roos | 137/624.13 |
| 3,198,004 | 8/1965 | Roberts et al. | 73/45.1 |
| 3,201,921 | 8/1965 | Heyes | 95/92 |
| 3,231,492 | 1/1966 | Stine et al. | 210/676 |
| 3,329,166 | 7/1967 | Kiernan | 137/625.16 |
| 3,706,812 | 12/1972 | Derosset et al. | 585/822 |
| 3,891,552 | 6/1975 | Prior et al. | 210/264 |
| 4,259,288 | 3/1981 | Welch | 422/63 |
| 4,522,726 | 6/1985 | Berry et al. | 210/660 |
| 4,574,842 | 3/1986 | Cordova | 137/625.46 |
| 4,612,022 | 9/1986 | Berry | 95/113 |
| 4,700,745 | 10/1987 | Ellis | 137/625.11 |
| 4,764,276 | 8/1988 | Berry et al. | 210/264 |
| 4,808,317 | 2/1989 | Berry et al. | 210/660 |
| 5,069,883 | 12/1991 | Matonte | 422/269 |
| 5,073,255 | 12/1991 | Chili et al. | 210/284 |
| 5,478,475 | 12/1995 | Morita et al. | 210/264 |

FOREIGN PATENT DOCUMENTS

| | | |
|---|---|---|
| 542952 | 1/1977 | U.S.S.R. |
| 584245 | 12/1977 | U.S.S.R. |
| 641340 | 1/1979 | U.S.S.R. |
| 1236893 | 2/1987 | U.S.S.R. |

OTHER PUBLICATIONS

ISEP —*A Moving Bed Contractor for Chromatographic Separations*, Presented at the 4th Workshop on Preparative HPLC, 28–31th Mar., 1983, Salzburg, Austria, G.J. Rossiter.

*Primary Examiner*—Ivars Cintins
*Attorney, Agent, or Firm*—Burns, Doane, Swecker & Mathis, L.L.P.

[57] ABSTRACT

An apparatus for continuous fluid-solid contacting includes a plurality of chambers on a rotating carousel, each chamber having a supply conduit and a discharge conduit, and a single valve for controlling a supply and discharge of fluid to the chambers. The valve includes a stationary annular disk having a plurality of conduits and a lower planar surface forming a disk valve face, and a rotatable annular plate having an upper planar surface forming a plate valve face and a plurality of holes forming ports in the plate valve face. The plate is supported in pressurized contact with the disk valve. The frame supporting the chambers and the annular plate are rotated by separate devices. To ensure that the valve ports remain in rotational correspondence with the rotating chamber frame, the invention includes optical control for synchronizing the rotation of the frame and the rotation of the annular plate.

20 Claims, 4 Drawing Sheets

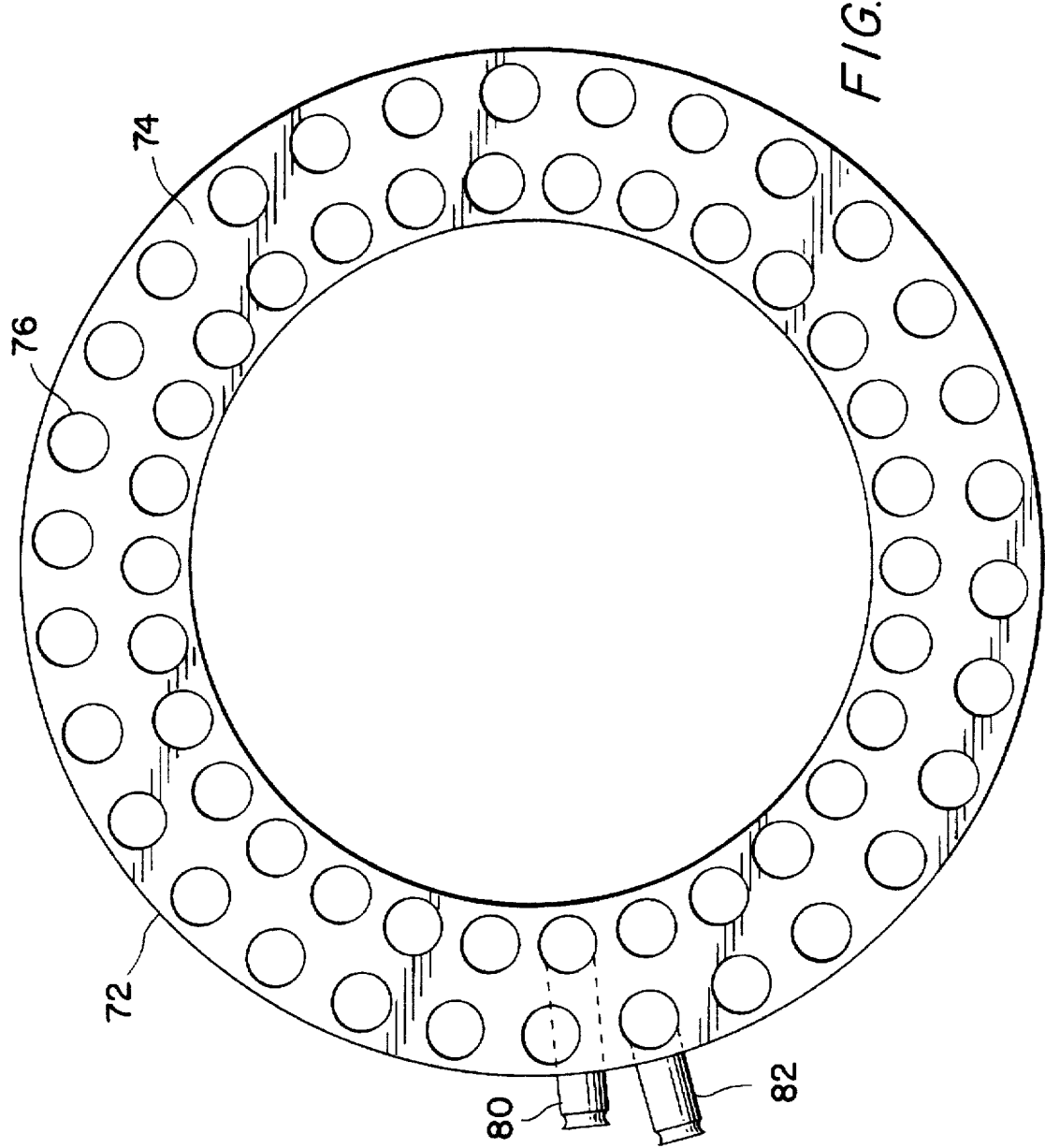

FLUID-SOLID CONTACTING APPARATUS

FIELD OF THE INVENTION

The present invention relates to continuous fluid-solid contacting apparatus used in physical, chemical and chromatographic separation processes.

BACKGROUND OF THE INVENTION

Continuous fluid-solid contacting systems strive, through various apparatuses and with varying degrees of success, to move a fluid phase in counter-current contact with a solid phase. A system capable of actually moving a solid phase in truly continuous counter-current contact with a liquid phase has yet to be developed, however. The known systems have deficiencies, among others, relating to the expenses to construct and operate some systems and the difficulties in adapting some systems to large volume flow requirements and/or complex flow distributions.

Systems that use multiple columns and complicated valve sequencing tend to be expensive because of the extensive controls and piping required to link the columns to each other and with the feed and discharge lines from the process apparatus. The cost and complexity of such systems rises very quickly as steps are added, for example, beyond a convention four step process (e.g. adsorption, wash, regeneration, rinse).

Other continuous counter-current systems utilize bed sections stacked in vertical towers, and typically include an adsorbent tower, an elution tower and intermediate wash sections. Sorbent is moved from section to section and tower to tower hydraulically on an intermittent basis. These systems require a large excess of wash fluid to transport the sorbent, and frequently experience loss of sorbent during the transport procedures.

Some systems maintain and transport packed sorbent in a loop of pipe divided into zones by knife valves. After the sorbent is transported to a zone, fluid is pumped into a chamber to flow opposite to the direction of movement of the sorbent. Sorbent is transported by opening the valve and pulsing the sorbent bed to the next zone, after which fluid movement is resumed. These systems also suffer from loss of sorbent trapped in the valves. Trapped sorbent also causes leakage from the valves.

U.S. Pat. Nos. 4,764,276 and 4,808,317, both to Berry et al, disclose a fluid-solid contacting system having a plurality of sorbent-containing columns and upper and lower distributor valves to control the flow of fluid into and out of the columns. The columns rotate on a carousel and the relative movement of the columns to the valve ports and the piping to and from the valve controls the flow of fluid through the columns. A difficulty with this system is that a small misalignment of the upper and lower valves can cause pressure increases in the system piping, and more seriously, a complete cut-off of fluid to a column or a misdirection of fluid into another column. Another difficulty lies in the piping necessary to connect the top stationary valve to the bottom stationary valve for countercurrent flow, which can add considerable cost to the system depending on the complexity of the flow requirements. In addition, the volume of liquid in the connecting pipes is out of phase when a column moves from one port to the next and causes back mixing in the newly connected columns.

U.S. Pat. No. 5,069,883 to Matonte discloses an apparatus using a single valve, rather than separate upper and lower valves, to connect a plurality of columns rotating on a carousel. The valve includes an inner cylinder that fits partially inside a rotating outer cylinder. As shown in FIG. 4, the inner cylinder is stationary and includes a first plurality of inlet and outlet ports that communicate with external supply and discharge lines. A second plurality of inlet and outlet ports communicate with inlet and outlet port formed in the outer cylinder. Internal piping connects the first inlet and outlet ports with the second inlet and outlet ports. The outer cylinder, which rotates with the columns, includes pipes connecting the ports to the columns. Rotation of the outer cylinder relative to the inner cylinder causes the inlet and outlet ports of the inner cylinder to connect with the ports on the outer cylinder. The inner cylinder includes sealing ribs on the surface contacting the outer cylinder, and the inner cylinder may be pressurized to increase contact pressure with the outer cylinder for a better seal.

The '883 apparatus is difficult to scale up mechanically for large flow requirements. Other difficulties arise from torsion forces imparted to the inner cylinder as the outer cylinder rotates in contact against it, which deform the inner cylinder. In addition, the internal piping to connect the first ports with the second ports includes out of phase fluid volume that causes back mixing.

SUMMARY OF THE INVENTION

The present invention provides an apparatus for continuous fluid-solid contacting that eliminates many of the disadvantages in the art. The apparatus according to the present invention provides a single distribution valve that eliminates the alignment problems of upper and lower valve arrangements and the mechanical problems of the double-cylinder arrangement. The valve according to the present invention provides horizontal, planar contacting surfaces for improved valve port contact that eliminates the sealing and deformation difficulties in the double cylinder valve arrangement. In addition, the valve of the present invention simplifies the required piping and eliminates much of the out of phase volumes causing back mixing in the known arrangements.

The fluid-solid contacting apparatus according to the present invention comprises a plurality of chambers supported on a rotatable frame, or carousel, each chamber having a supply conduit and a discharge conduit, and a single valve for controlling a supply and discharge of fluid to the chambers. The chambers are preferably formed as columns and include means for containing a solid sorbent material for flow therethrough by a fluid. The valve according to the present invention is formed as two heads, each having an annular surface with a plurality of openings that serve as fluid ports. The annular surfaces contact on a plane and are rotatable relative to one another to open and close the valve ports for fluid flow between the heads. A fixed head is preferably formed of a plastic material and a rotating head is preferably formed of a metal. Plastic against metal on the contacting plane reduces friction in rotating the rotating head. In addition, the plastic surface deforms under pressure, which helps to provide a seal on the surfaces.

More particularly, the valve according to the present invention includes a stationary annular disk having a lower planar surface forming a disk valve face and a plurality of conduits formed in the disk, the conduits extending to the lower planar surface to form openings in the disk valve face and a rotatable annular plate having an upper planar surface forming a plate valve face and a plurality of holes forming ports in the plate valve face. The plate valve face is disposed in contact with the disk valve face. A plurality of supply and discharge pipes are connected to the plate on a lower surface opposite the upper planar surface, each pipe communicating with one of the holes and connected with one of a supply and discharge conduit of the chambers.

A novel and advantageous feature of the present invention is separate means for rotating the frame supporting the chambers and the annular plate. By separating the drive for the carousel from the drive for the valve, the apparatus according to the present invention may be scaled for large capacity chambers and valves without the problems known in the art. To ensure that the valve ports remain in rotational coordination with the rotating chamber frame, the apparatus of the invention includes means for synchronizing the rotation of the frame and the rotation of the annular plate. According to a preferred embodiment of the invention, the means for synchronizing rotation of the frame and the annular plate comprises optical encoding means applied to each of the rotating frame and the annular plate and optical sensors disposed in a relatively fixed position to read the optical encoding means. A control device, responsive to signals received from the optical sensors, controls the rotation of the frame and annular plate.

The present invention further provides means for applying a force to pressure the disk valve face against the plate valve face for effective sealing. In a preferred embodiment of the invention, the means for applying the force comprises an annular shaped bladder positioned on an upper horizontal face of the annular disk opposite the disk valve face. The bladder covers an area substantially equal to the area of the disk valve face and includes means for connecting the bladder to a source of pressurized fluid. The bladder provides a force on the disk to force the disk face against the valve face of the plate to seal the faces together, preventing leakage both radially outward from the valve and between valve ports.

Maintaining the annular plate in a planar relationship with the annular disk is important to the operation of the valve. The annular plate is therefore provided with a support frame comprising a cylindrical frame member attached to a radially inner edge of the annular plate. The lower edge of the cylindrical frame member includes a flange extending radially outward. A plurality of gussets extend radially outward from an outer cylindrical surface of the cylindrical frame and are attached to the lower surface of the plate and the upper surface of the flange.

The drive device for the annular disk includes a ring shaped rotation bearing positioned on a lower edge of the cylindrical frame and a ring gear fixed to the rotation bearing. A motor drives the ring gear for rotating the frame.

BRIEF DESCRIPTION OF THE DRAWINGS

A preferred embodiment of the present invention is illustrated in the appended drawings, wherein like elements are provided with the same reference numerals. In the drawings:

FIG. 4 is a plan view of a plate valve face of the valve of FIG. 2.

DETAILED DESCRIPTION OF PREFERRED EMBODIMENTS

Figure 1:
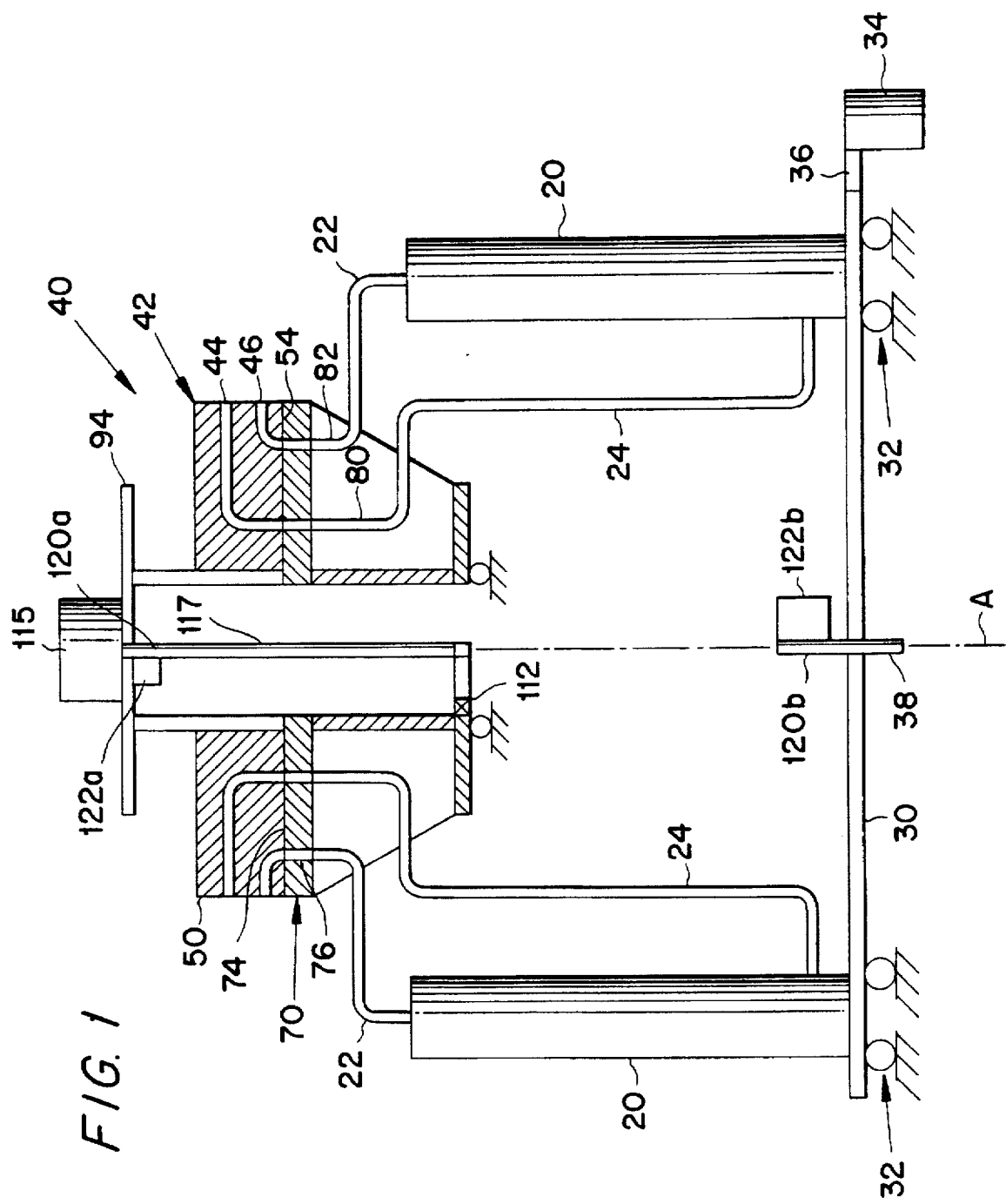
FIG. 1 is a schematic view of the continuous contacting apparatus according to the present invention.

A continuous fluid-solid contacting apparatus according to the present invention is illustrated in schematic view in FIG. 1. The apparatus includes a plurality of contacting chambers 20 carried on a rotatable frame, which in the illustrated embodiment is shown as a carousel 30, and distributor valve 40. The schematic FIG. 1 is, of course, not to scale; the valve has been drawn much larger relative to the chambers and carousel for clarity of illustration.

The carousel 30 includes roller support means 32 to support the carousel for rotation about an axis A. The roller support means may be selected appropriate for the size and weight of the carousel 30 and chambers 20. For smaller structures a simple roller bearing may be sufficient, while larger structures may be better served by a plurality of wheels or rollers riding on a circular track. Rotating drive means, for example, a motor 34 and driving gear 36 act on the carousel to impart rotation. The motor 34 and gear 36 may be located where convenient, for example, at a periphery of the carousel, as shown in FIG. 1, or alternatively at the center.

Each of the chambers 20 includes an inlet conduit 22 and an outlet conduit 24. Although the inlet conduit 22 is shown entering the chamber 20 at an upper end, and the outlet 24 at a bottom end, this is for convenience of the illustration only. The relative orientation of the inlet 22 and outlet 24 conduits may be as appropriate to the process. Each chamber 20 includes means for containing a solid material, a resin for example, for contact with a fluid moving through the chamber. The fluids may be liquid or gas.

Figure 2:
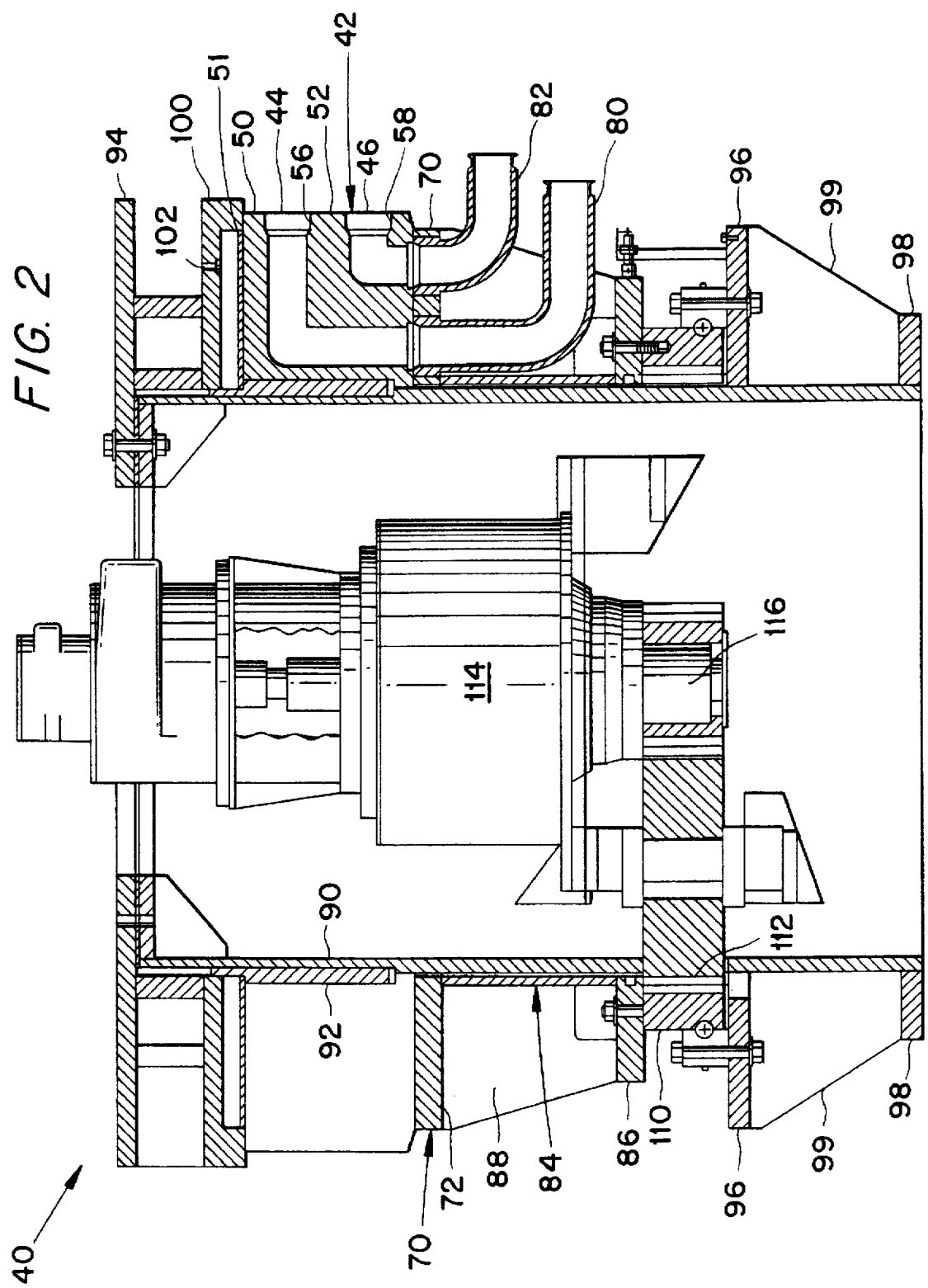
FIG. 2 is an elevational view of an integrated distributor valve, partly in section, of the apparatus of FIG. 1.

The valve 40 according to the present invention includes a stationary head 42 and a rotating head 70. FIG. 2 is a sectional elevation of the valve 40 illustrating the valve in greater detail. With reference to FIG. 1 and FIG. 2, the stationary head 42 includes a plurality of conduits 44, 46 formed to open on a horizontal planar face of the stationary head 42.

The rotating head 70 includes an annular plate 72 having a horizontal planar surface, or plate valve face 74, in contact with the horizontal planar face of the disk. The plate 72 includes a plurality of holes 76 that form valve ports in the plate valve face 74. Each of the holes 76 is connected to a pipe 80, 82 on a lower face of the plate opposite the plate valve face 74. The pipes 80, 82 connect the holes 76 to the inlet 22 and outlet 24 conduits of the chambers 20.

The rotating head 70 is supported for co-axial rotation about the axis A with the carousel 40. As may be understood from FIG. 1, rotation of the rotating head 70 causes the ports or holes 76 in the rotating head to encounter the conduits 44, 46 of the stationary head 42 in sequence. The conduits in the stationary head 42 are preferably arranged as supply conduits 44 and discharge conduits 46. The supply conduits 44 may be connected to an external fluid supply (not illustrated), or to one of the discharge conduits, depending on the needs of the process. The discharge conduits 46, may, as mentioned, be connected to a supply conduit 44, or may be connected to an external chamber or tank (not illustrated).

FIG. 2 illustrates the construction of the valve 40 in greater detail. The stationary head 42 includes an annular disk 50 formed of a plastic material. The conduits 44, 46 are machined in the disk 50 and extend from a radially outer surface 52 of the disk to the planar face or disk valve face 54. On the radially outer surface 52 of the disk 50, the conduits 44, 46 end in terminations 56, 58 for connecting the conduits to piping, for example, for external fluid sources.

Figure 3:
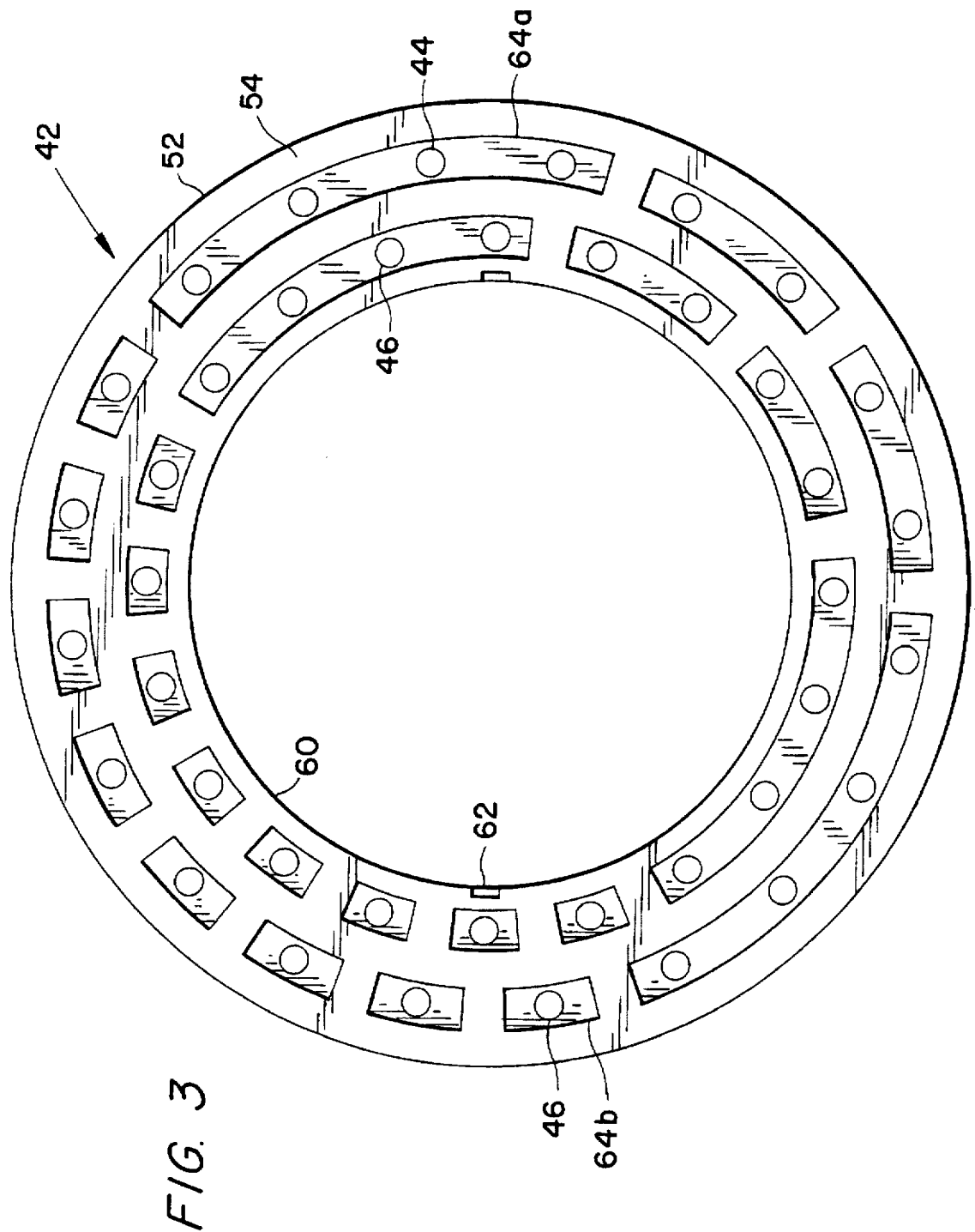
FIG. 3 is a plan view of a disk valve face of the valve of FIG. 2.

FIG. 3 shows the disk valve face 54. The conduits 44, 46 open on the disk valve face 54 for communication with the plate valve face 74. The conduits 44, 46 are arranged on two concentric circles with the inlet conduits 44 on the radially inner circle and the outlet conduits on the radially outer circle. The disk valve face 54 may also include troughs 64a that allow flow communication between two or more circumferentially adjacent conduits on the disk valve face. This is advantageous where adjacent chambers are used for a single treatment step. Troughs 64b may also be used for a single conduit to widen the opening on the disk valve face 54 to ease the pressure changes as the openings move into and out of communication with the openings on the plate valve face 74.

FIG. 4 is a view of the plate valve face 74. The holes 76 in the plate valve face 74 are arranged in two concentric circles having the same radii as the circles on which the conduits are formed in the disk valve face 54 so that the holes 76 align with the openings 44, 46 in the disk valve face 54. The pipes 80, 82 are connected to the plate 72 on a surface opposite to the plate valve face 74, each pipe in alignment with a hole 76. For clarity, only two pipes 80, 82 are shown, and each of the holes 76 is understood to be connected to a pipe. As better illustrated in FIG. 2, the openings in the disk valve face 54 and the holes in the plate valve face 74 are preferably formed with substantially equal diameters.

The embodiment of the disk 50 in FIG. 3 shows 20 openings on each circle and FIG. 4 shows 30 holes on each of the concentric circles. Such an arrangement is useful in chromatic separation processes. Other arrangements may be selected by one skilled in the art appropriate for a particular process, and the invention is not limited to a particular number of valve ports or treatment chambers.

The annular disk 50 is supported on a valve frame that includes a cylindrical element 90 which fits inside the center opening of the annular disk 50. A radially inner surface 60 of the annular disk 50 includes at least one key slot 62, seen in FIG. 3, that engages a key 92 on the radially outer surface of the cylindrical element 90. The key 92 may be formed as part of the cylindrical element 90 or configured as an elongated bar fastened to the element as shown in FIG. 2. The key 92 prevents the annular disk from rotating, but does not supply a vertical restraint.

The annular disk 50 rests on the annular plate 72, as mentioned. A bladder 100 is disposed in contact with an upper planar surface 51 of the annular disk 50 and vertically restrained by an upper frame flange or crown 94. The bladder 100 includes a valve to connect the bladder to a source of pressurized fluid, which may be pneumatic or hydraulic fluid. The bladder 100 is annular shaped and contacts an area substantially equal to the area of the disk valve face 54. The bladder 100 is thus able to apply a uniform force against an area of the annular disk so that the disk valve face 54 presses with uniform pressure on the plate valve face 74. Other means of applying uniform force on the annular disk may be employed, for example, springs. As may be understood, fluid flowing through the conduits 44, 46 and the pipes 80, 82 tends to force apart the annular disk 50 and annular plate 72. The pressure provided by the bladder 100 helps to seal the disk valve face 54 to the plate valve face 74 to prevent leakage radially outward from the valve or between valve ports.

The cylindrical element 90 includes two lower spaced flanges 96, 98. A plurality of gussets 99 are mounted to the outer surface of the cylinder element 90 and extend between the two spaced flanges 96, 98 to provide a supporting platform for the rotating head 70.

The valve frame may be mounted to an external fixed support means by any convenient structure, for example, by mounting the crown 94 to a beam (not illustrated) or by mounting the cylindrical frame element 90 to a bottom positioned base (also not illustrated).

The plate 72 is formed of metal and is supported on a cylindrical body 84 and flange ring 86. The cylindrical body 84 rests on the outer surface 90 of the frame cylinder 90. A plurality of gussets 88 are fixed to the cylindrical body 84 and extend between the plate 72 and the flange ring 86. The pipes 80, 82, are positioned between adjacent gussets 88. The pipes 80, 82 are made of metal and may be formed by casting or another appropriate method.

The flange ring 86 is supported for rotation on a ring bearing 110, and the ring bearing is supported by the flange 96 of the valve frame. A radially inner side of the ring bearing 110 is provided with a ring gear 112 for driving the rotating head 70. Drive motor 114 drives the rotating head 70 through the ring gear 112. The drive motor 114 is illustrated as positioned in the cylindrical frame element 90, with shaft 116 directly coupled to the ring gear 112. The drive motor 114 is supported on the frame crown 94. Alternatively, as shown in FIG. 1, a drive motor 115 may be positioned outside of the frame cylindrical member 90 with an elongated shaft 117 extending into the cylindrical member 90 to couple to the ring gear 112.

The rotating head 70 of the valve 40 and the carousel 30 are driven by separate drives and synchronization means of the drives is provided. In a preferred embodiment of the invention, illustrated in conjunction with FIG. 1, the synchronization means comprises an optical coding means 120a, 120b fixed to a rotating element of each of the rotating head 70 and the carousel 30, respectively, and a stationary optical sensor 122a, 122b disposed to read the optical code to determine the angular position of the rotating element. As shown in FIG. 1, the optical coding 120a is fixed to the shaft 117 of the rotating head drive 115. The optical sensor 122b is positioned on the valve frame crown 94. The optical coding 120a is placed on a shaft 38 of the carousel 30 and the sensor 122b is fixed relatively to the optical coding. A control means communicates with both optical sensors 122a, 122b and controls the drive motor 115 and carousel motor 34 to coordinate and synchronize rotation of the rotating head 70 and carousel 30. The control means also synchronizes the speed of rotation of the rotating head 70 and the carousel 30 when cycle time is changed in the process.

By separating the drive for the carousel 30 from the drive for the valve 40, the apparatus of the present invention may be scaled up for large fluid flows and correspondingly large chambers and valves, without the difficulties encountered in conventional apparatus, for example, excessive shaft torsion that causes misalignment of the valve and carousel. In addition, the integral structure of the valve 40 allows it to be easily removed from the carousel 30 for repair or reconditioning, and the valve may be tested before being installed on the carousel apparatus.

The foregoing has described the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes and equivalents may be made by others without departing from the scope of the present invention as defined by the following claims.

What is claimed is:

1. A liquid-solid contacting apparatus, comprising:
   a plurality of chambers, each chamber having a supply conduit and a discharge conduit;
   a rotatable frame for supporting the chambers;
   first rotating means for rotating the frame about an axis of rotation;
   a single valve for controlling a supply and discharge of at least one fluid to the chambers, the valve comprising
      a stationary annular disk having a lower planar surface forming a disk valve face and a plurality of conduits formed in the disk, the conduits extending to the lower planar surface to form openings in the disk valve face,
      a rotatable annular plate having an upper planar surface forming a plate valve face and a plurality of holes forming ports in the plate valve face, the plate valve face contacting the disk valve face, so that by rotation of the plate the openings in the plate and the ports in the disk are alignable for direct flow communication between the openings and ports,
      a plurality of supply and discharge pipes connected to the plate on a lower surface opposite the upper planar surface, each pipe communicating with one of said holes and connected with one era supply and discharge conduit of the chambers, and
      second rotating means for rotating the annular plate about the axis of rotation of the frame, wherein passage of ports in the plate valve face across openings in the disk valve face allows flow of the at least one fluid through the ports and openings; and
   means for synchronizing rotation of the frame and the rotation of the annular plate by said first rotating means and said second rotating means.

2. The apparatus as claimed in claim 1, further comprising means for applying a force to pressure the disk valve face against the plate valve face.

3. The apparatus as claimed in claim 2, wherein the means for applying the force comprises:
   an annular shaped bladder positioned on an upper horizontal face of the annular disk opposite the disk valve face, the bladder covering an area substantially equal to an area of the disk valve face; and
   means for connecting the bladder to a source of pressurized fluid.

4. The apparatus as claimed in claim 1, further comprising means for supporting the annular plate comprising a cylindrical frame attached to a radially inner edge of the annular plate and plurality of gussets extending radially outward from an outer cylindrical surface of the cylindrical frame and attached to the lower surface of the plate.

5. The apparatus as claimed in claim 4, further comprising a ring shaped rotation bearing positioned on a lower edge of the cylindrical frame.

6. The apparatus as claimed in claim 5, further comprising a ring gear fixed to the rotation bearing, wherein the means for rotating the annular plate drives the ring gear.

7. The apparatus as claimed in claim 1, wherein the means for synchronizing rotation synchronizes an angular orientation and a speed of rotation of the frame and the annular plate.

8. The apparatus as claimed in claim 1, wherein the means for synchronizing rotation of the frame and the annular plate comprises optical encoding means that rotate with each of the rotating frame and the annular plate and optical sensors disposed in a relatively fixed position to the optical encoding means to sense and provide a signal indicating a relative rotational position of the optical encoding means, and means for controlling the rotation of the frame and annular plate responsive to the signals received from the optical sensors.

9. The apparatus as claimed in claim 1, wherein the annular disk is formed of a plastic material.

10. The apparatus as claimed in claim 1, wherein the annular plate is formed of a metal.

11. The apparatus as claimed in claim 1, wherein the holes in the annular plate are disposed as inlet holes along a first circle and outlet holes along a second circle concentric with the first circle.

12. The apparatus as claimed in claim 1, wherein the chambers include means for containing a solid sorbent material for contact with a fluid flowing through the chamber.

13. In a liquid-solid contacting apparatus of the type having a plurality of chambers, each chamber having a supply conduit and a discharge conduit, a main frame for supporting the chambers, means for rotating the main frame about an axis of rotation, and, a valve for controlling a supply and discharge of at least one fluid to the chambers, the valve comprising:
   a valve frame;
   a stationary annular disk supported on the valve frame, the annular disk having a lower planar surface forming a disk valve face and a plurality of conduits formed in the disk, the conduits extending to the lower planar surface to form openings in the disk valve face;
   a rotatable annular plate rotatably supported on the valve frame, the annular plate having an upper planar surface forming a plate valve face and a plurality of holes forming ports in the plate valve face, the plate valve face contacting the disk valve face;
   a plurality of supply and discharge pipes connected to the plate on a lower surface opposite the upper planar surface, each pipe communicating with one of said holes and connected with one of a supply and discharge conduit of the chambers;
   means for rotating the annular plate about the axis of rotation of the frame;
   an annular shaped bladder disposed on an upper planar surface of the disk, the bladder covering an area substantially equal to an area of the disk valve face on the lower planar surface opposite to the bladder, to apply a force for pressurizing the disk valve face against the plate valve face; and
   means for connecting the bladder to a source of pressurized fluid.

14. The apparatus as claimed in claim 13, further comprising means for supporting the annular plate on the valve frame comprising a cylindrical member attached to a radially inner edge of the annular plate and plurality of gussets extending radially outward from an outer cylindrical surface of the cylindrical member and attached to the lower surface of the plate.

15. The apparatus as claimed in claim 14, further comprising a ring shaped rotation bearing positioned on a lower edge of the cylindrical member.

16. The apparatus as claimed in claim 15, further comprising a ring gear fixed to the rotation bearing, wherein the means for rotating the annular plate drives the ring gear.

17. The apparatus as claimed in claim 13, further comprising means for synchronizing the rotation of the main frame and the rotation of the annular plate.

18. The apparatus as claimed in claim 17, wherein the means for synchronizing rotation synchronizes an angular orientation and a speed of rotation of the frame and the annular plate.

19. The apparatus as claimed in claim 17, wherein the means for synchronizing rotation of the main frame and the annular plate comprises optical encoding means that rotate with each of the main frame and the annular plate and optical sensors disposed in a relatively fixed position to the optical encoding means, and means for controlling the rotation of the main frame and annular plate responsive to signals received from the optical sensors.

20. A liquid-solid contacting apparatus, comprising:
 a plurality of chambers, each chamber having a supply conduit and a discharge conduit;
 a rotatable frame for supporting the chambers;
 means for rotating the frame about an axis of rotation;
 a valve for controlling a supply and discharge of at least one fluid to the chambers, the valve comprising:
  a stationary annular disk having a lower planar surface forming a disk valve face and a plurality of conduits formed in the disk, the conduits extending to the lower planar surface to form openings in the disk valve face,
  a rotatable annular plate having an upper planar surface forming a plate valve face and a plurality of holes forming ports in the plate valve face, the plate valve face contacting the disk valve face,
  a plurality of supply and discharge pipes connected to the plate on a lower surface opposite the upper planar surface, each pipe communicating with one of said holes and connected with one of a supply and discharge conduit of the chambers, and
 means for rotating the annular plate about the axis of rotation of the frame; and
 means for synchronizing the rotation of the frame and the rotation of the annular plate, including optical encoding means that rotate with each of the rotating frame and the annular plate and optical sensors disposed in a relatively fixed position to the optical encoding means to sense and provide a signal indicating a relative rotational position of the optical encoding means, and means for controlling the rotation of the frame and annular plate responsive to the signals received from the optical sensors.

* * * * *